US009710270B2

(12) United States Patent
Asamoto (10) Patent No.: US 9,710,270 B2
(45) Date of Patent: Jul. 18, 2017

(54) EXCEPTION CONTROL METHOD, SYSTEM, AND PROGRAM

(75) Inventor: Noriaki Asamoto, Shiga (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1154 days.

(21) Appl. No.: 13/330,819

(22) Filed: Dec. 20, 2011

(65) Prior Publication Data

US 2012/0159134 A1 Jun. 21, 2012

(30) Foreign Application Priority Data

Dec. 20, 2010 (JP) ................................ 2010-283459
Dec. 20, 2010 (JP) ................................ 2011-072876

(51) Int. Cl.
*G06F 9/30* (2006.01)
*G06F 9/38* (2006.01)

(52) U.S. Cl.
CPC ...... *G06F 9/30076* (2013.01); *G06F 9/30185* (2013.01); *G06F 9/3865* (2013.01)

(58) Field of Classification Search
CPC ................................................ G06F 9/30076
See application file for complete search history.

(56) References Cited

U.S. PATENT DOCUMENTS 6,151,669 A * 11/2000 Huck et al. .................. 712/222
6,405,300 B1 * 6/2002 Tremblay ............ G06F 9/30189 708/708
6,820,155 B1 11/2004 Ito
2002/0029328 A1 * 3/2002 Nguyen et al. ................. 712/23
2005/0076186 A1 * 4/2005 Traut ................. G06F 9/45558 712/1

FOREIGN PATENT DOCUMENTS

JP 62212732 A 9/1987
JP 0496167 A 3/1992
JP 0496167 A1 3/1992
JP 4169937 A 6/1992
JP 04230533 A 8/1992
JP 04230533 A1 8/1992

(Continued)

OTHER PUBLICATIONS

JP Application 2010-283459, filed on Dec. 20, 2010, entitled: "Exception Control Method, System, and Program", 39 pages.

*Primary Examiner* — John Lindlof
(74) *Attorney, Agent, or Firm* — Erik K. Johnson (57) ABSTRACT

A method for programmably controlling an exception includes performing, by a processor, a step of executing a control specification instruction for exception control specification that indicates whether an exception is enabled or not and setting a control specification value for the exception in a register and a step of executing a control execution instruction for exception control execution that indicates whether the exception is to be raised or not, determining whether the control specification value set in the register is a value for enabling the exception, and, when the control specification value is the value for enabling the exception, raising the exception. The method further includes performing a step of not raising the exception when the control specification value set in the register is not the value for enabling the exception.

14 Claims, 8 Drawing Sheets

(56) References Cited

FOREIGN PATENT DOCUMENTS

| | | | |
|---|---|---|---|
| JP | 04287231 | A | 10/1992 |
| JP | 04287231 | A1 | 10/1992 |
| JP | 0535499 | A | 2/1993 |
| JP | 0535499 | A1 | 2/1993 |
| JP | 0744398 | A | 2/1995 |
| JP | 0744398 | A1 | 2/1995 |
| JP | 2001166950 | A | 6/2001 |
| JP | 2002204172 | A | 2/2002 |
| JP | 2002-196938 | A1 | 7/2002 |
| JP | 2002196938 | A | 7/2002 |
| JP | 2002-323983 | A1 | 11/2002 |
| JP | 2002323983 | A | 11/2002 |
| JP | 2004230533 | A1 | 8/2004 |
| JP | 2004-272939 | A1 | 9/2004 |
| JP | 2004272939 | A | 9/2004 |
| JP | 2004287231 | A1 | 10/2004 |
| JP | 2007044398 | A1 | 2/2007 |
| JP | 2008-015883 | A1 | 1/2008 |
| JP | 2008015883 | A | 1/2008 |
| WO | 2012086288 | A1 | 6/2012 |

\* cited by examiner

FIG. 1

PRIOR ART

EXCEPTION CONTROL METHOD, SYSTEM, AND PROGRAM

TECHNICAL FIELD

The present invention relates to control of exceptions and, in particular, to a method, system, and computer program for programmably controlling an exception.

BACKGROUND

Current CPUs raise an exception when a hardware error or access violation occurs in executing a CPU instruction. If a CPU exception occurs, an interruption happens and exception handling code at a specified address is executed. When the exception handling is completed, processing returns to the location where the exception occurs and restarts the execution. For a critical error or special case, processing may not return to the location where the exception occurs.

There are various kinds of CPU exceptions, such as an error on execution, translation look-aside buffer (TLB) miss, and timer interruption. Their uses and conditions where an exception occurs are predefined, and the conditions cannot be flexibly changed in a software manner, i.e., cannot be programmably controlled. In other words, most exceptions do not intentionally occur in a location specified by a programmer.

A system call used for calling code of privileged mode from code of non-privileged mode and, for example, a trap instruction (tw instruction) of PowerPc (registered trademark of IBM) for determining by comparing two register values whether an exception is to be raised can raise the exception at a specified location. However, for the system call, the exception always occurs and cannot be disabled; for the above-described trap instruction, processing of acquiring two register values before execution and processing of comparing and determining the register values in the execution are necessary.

There is also a conditional branch instruction as a CPU instruction. A state that is a target for determination is reflected as a value of a register before a branch instruction is called, and whether branching is to be performed based on that value. A conditional branch instruction needs an operation on a volatile register in advance, and the conditional branch instruction itself is always executed even if branching is not performed.

In computer programming, special processing is often required to be performed only when a certain condition is satisfied. In such cases, a conditional branch instruction is typically used. That is, steps of updating a value of a register by some kind of operation in response to a CPU instruction and jumping to processing code in response to a conditional branch instruction depending on that value are performed. However, checking a rarely satisfied condition in a software manner each time is inefficient.

Figure 1:
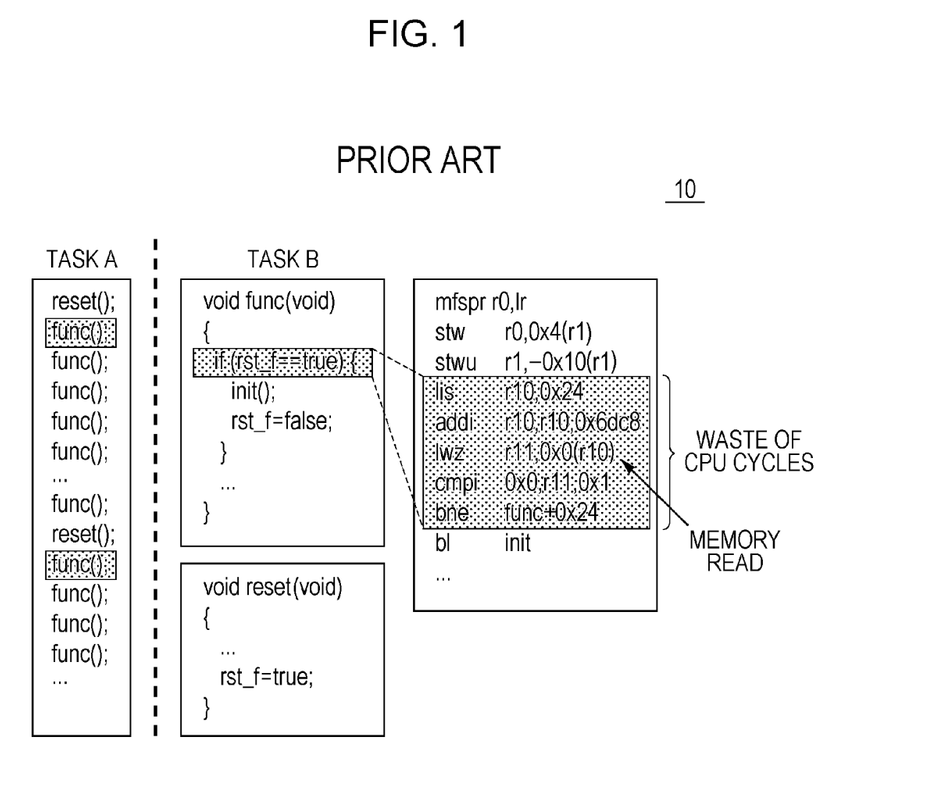
FIG. 1 shows a program that illustrates a conditional branch instruction for a rarely satisfied condition in the prior art.

FIG. 1 illustrates a conditional branch instruction 10 for a condition that is rarely satisfied in the prior art. Suppose, for task A, initialization function init( ) is needed in very rare cases, i.e., only at the beginning and in calling func( ) after reset( ) and also init( ) is called only from the same process space as that for task B. Therefore, it is necessary to check whether the current state is a reset state before certain processing is started to perform initialization processing in the case of the reset state. If such a reset state rarely occurs, the time consumed in this checking process is wasted almost all the time. In particular, from the point of view of the assembler language level, which is shown at the right side, processing of determining whether the current state is a reset state in task B wastes time, for example, in the case of memory access occurring in some miner determination. Specifically, if an rst_f variable is a variable at an address indicated by a pointer variable of a structure member, i.e., if memory is frequently referred to, or if a conditional expression contains "and" or "or," such as "if (A or B or C . . . )," the consumed time is further longer.

Patent Literature 1 describes, in an exception handling control method for shifting processing to an exception handling procedure indicated by "CALL" or another instruction word, speeding up propagation to exception handling to enhance the speed of exception handling by scanning a list of exception handlers registered by exception handler registration means and shifting control of exception handling directly to an exception handler associated with an exception condition identifier.

Patent Literature 2 describes a microprocessor that can suppress consumption of a program memory required for a branch instruction by having, address setting means for setting an interruption address for each interruption cause in a region other than an instruction memory and a multiplexer for inputting an output of the address setting mechanism using a cause detected by an interrupt detecting circuit as a selection signal into a program counter, increase the efficiency of the program memory by deleting an inefficient space of the program memory, and shorten the time required for handling an interruption.

Patent Literature 3 describes an exception handling mechanism that can prevent the presence or absence of an exception handler from affecting a throughput of a normal processing program by preparing the normal processing program, a plurality of programs of exception handlers, and a previously coded execution state and exception status of the normal processing program at which it is necessary to select each of the exception handlers and perform exception handling, adding them as information in program code in association with respective exception handlers, comparing an execution state of the normal processing program occurring when an exception is detected with the information indicating the execution state of the normal processing program added for each exception handler, selecting an appropriate exception handler, and controlling the execution.

SUMMARY OF INVENTION

Traditionally, if a condition meets, exception always occurs and a conditional branch instruction itself is always carried out. That is, software-controlling that selects raising or not raising an exception or selects executing or not executing a conditional branch instruction itself is not performed, and processing operation that is actually unnecessary is also performed by a program.

A method for programmably controlling an exception according to one embodiment includes performing, by a processor, a step of executing a control specification instruction for exception control specification that indicates whether an exception is enabled or not and setting a control specification value for the exception in a register and a step of executing a control execution instruction for exception control execution that indicates whether the exception is to be raised or not, determining whether the control specification value set in the register is a value for enabling the exception, and, when the control specification value is the value for enabling the exception, raising the exception. The method further includes performing a step of not raising the exception when the control specification value set in the register is not the value for enabling the exception.

Preferably, the control specification instruction may include a bitmap index field and a control specification field, the register may include a bitmap register, and the step of setting the control specification value may include performing a step of setting a value of the control specification field in a bit in the bitmap register identified by a value of the bitmap index field.

Preferably, the control execution instruction may include a bitmap index field, and the step of raising the exception may include performing the step of raising the exception when the value of the control specification field set in the bit in the bitmap register identified by a value of the bitmap index field is the value for enabling the exception.

Preferably, the register may further include a return address register, and the step of raising the exception may further include performing a step of setting an address next to the control execution instruction in the return address register.

Preferably, the control execution instruction may further include a key code field, the register may further include a key register, and the step of raising the exception may further include performing a step of setting a value of the key code field in the key register so as to allow the value of the key code field to be used in handling the exception.

Preferably, the register may further include a vector base register, and the step of raising the exception may further include performing a step of referring to an address of an exception handler retained in the vector base register associated with the bit in the bitmap register identified by the value of the bitmap index field of the control execution instruction and jumping to the exception handler at the address.

Preferably, the step of not raising the exception may include performing the step of not raising the exception when the value of the control specification field set in the bit in the bitmap register identified by the value of the bitmap index field of the control execution instruction is not the value for enabling the exception. The step of not raising the exception may further include performing a step of discarding the control execution instruction in an instruction queue.

With one embodiment of the present invention, a computer program for programmably controlling an exception, the computer program causing a processor to perform the steps of the method described above, is provided.

For a system for programmably controlling an exception according to one embodiment of the present invention, a processor includes an exception control unit configured to execute a control specification instruction for exception control specification that indicates whether an exception is enabled or not and a control execution instruction for exception control execution that indicates whether the exception is to be raised or not to control the exception. The exception control unit includes a register, a control specification instruction processing part configured to execute the control specification instruction and set a control specification value for the exception in the register, and a control execution instruction processing part configured to execute the control execution instruction, determine whether the control specification value set in the register is a value for enabling the exception, and, when the control specification value is the value for enabling the exception, raise the exception. The control execution instruction processing part is configured to not raise the exception when the control specification value set in the register is not the value for enabling the exception.

Preferably, the control specification instruction may include a bitmap index field and a control specification field, the register may include a bitmap register, and the control specification instruction processing part may be configured to set a value of the control specification field in a bit in the bitmap register identified by a value of the bitmap index field.

Preferably, the control execution instruction may include a bitmap index field, and the control execution instruction processing part may be configured to raise the exception when the value of the control specification field set in the bit in the bitmap register identified by a value of the bitmap index field is the value for enabling the exception.

Preferably, the register may further include a return address register, and the control execution instruction processing part may be configured to set an address next to the control execution instruction in the return address register.

Preferably, the control execution instruction may further include a key code field, the register may further include a key register, and the control execution instruction processing part may be configured to set a value of the key code field in the key register so as to allow the value of the key code field to be used in handling the exception.

Preferably, the register further may include a vector base register, and the control execution instruction processing part may be configured to refer to an address of an exception handler retained in the vector base register associated with the bit in the bitmap register identified by the value of the bitmap index field of the control execution instruction and jump to the exception handler at the address.

Preferably, the control execution instruction processing part may be configured to not raise the exception when the value of the control specification field set in the bit in the bitmap register identified by the value of the bitmap index field of the control execution instruction is not the value for enabling the exception.

BRIEF DESCRIPTION OF DRAWINGS

Referring to the exemplary drawings wherein like elements are numbered alike in the several Figures.

DETAILED DESCRIPTION OF EMBODIMENTS

Best mode for carrying out the present invention will be described in detail below with reference to the drawings. The embodiments below are not intended to limit the scope of claims of the invention, and not all of the combinations of the features described in the embodiments are required for solution to problem. The present invention may be embodied in many different forms and should not be construed as limited to the contents of the embodiments set forth herein. The same portions and elements have the same reference numerals throughout the description of the embodiments.

Figure 2:
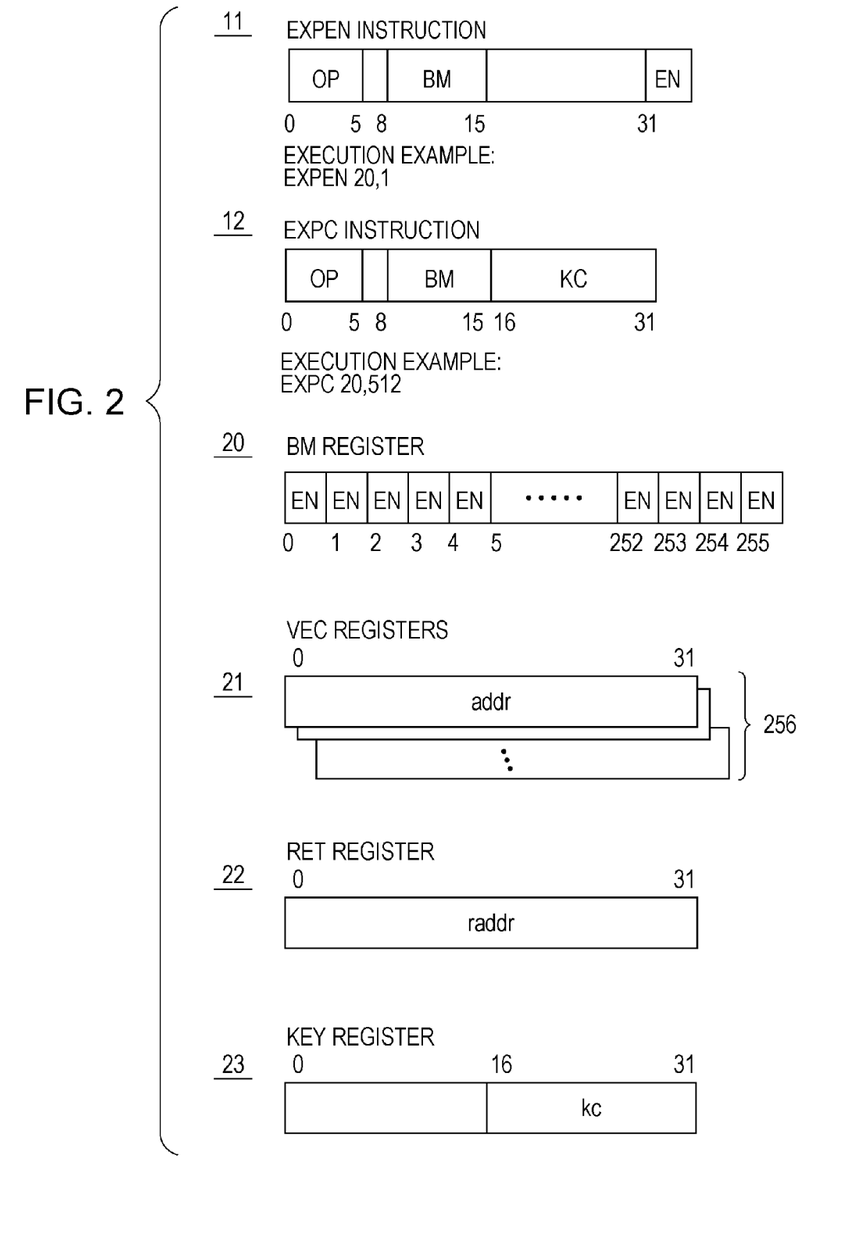
FIG. 2 illustrates a schematic configuration of two kinds of CPU instructions provided to achieve a software-controllable exception, a bitmap register indexed in the CPU instructions, and three kinds of registers corresponding to each exception according to one embodiment of the present invention.

First, FIG. 2 illustrates a schematic configuration of two kinds of CPU instructions provided to achieve a software-controllable exception, a bitmap register indexed in the CPU instructions, and three kinds of registers corresponding to each exception according to one embodiment of the present invention. Of the two kinds of CPU instructions, a first one is a control specification instruction 11 indicated by expen instruction provided to specify enabling (disabling) an exception, i.e., specify control of an exception, and a second one is a control execution instruction 12 indicated by expc instruction provided to raise or not to raise an exception in response to a condition for enabling or disabling, i.e., execute control of an exception. A bitmap register 20 indicated by BM register is provided to be indexed in two kinds of CPU instructions and define a condition for raising an exception.

Of the three kinds of registers, each of a plurality of vector base registers 21 indicated by VEC registers retains an address addr of an exception handler for handling an exception raised by the two kinds of CPU instructions and supports launching an exception handler by a CPU; a return address register 22 indicated by RET register retains a return address raddr next to the CPU instruction by which the exception is raised and supports returning from exception handling by a CPU; and a key register 23 indicated by KEY register retains a value kc specified by a program when the exception occurs, for example, a value of KC of an expc instruction and supports use in exception handling by the CPU. The number of VEC registers 21 corresponds to the number of exceptions handled for the two kinds of CPU instructions. In FIG. 2, the number of VEC registers 21 is 256. The RET register 22 and the KEY register 23 need to support merely the two kinds of CPU instructions; each of the number of RET registers 22 and that of KEY registers 23 is one.

The control specification instruction 11 has 32-bit configuration, but it is not limited to such a 32-bit configuration. An operation code field of the 0 to 5th bits expressed as OP indicates that this CPU instruction is one for specifying control of an exception, such as one for enabling (disabling) an exception. A bitmap index field of the 8th to 15th bits expressed as BM indicates an index in the 256-bit BM register 20 provided to determine whether an exception is to be raised or not for each of 256 kinds, which can be represented by 8 bits. For example, all of the 8th to 15th bits of the BM being zero indicates the initial 1st bit of the BM register 20; all of the 8th to 15th bits in the BM being one indicates the last 256th bit of the BM register 20. A control specification field of the 31st bit indicated by EN expresses a value for enabling or not enabling (disabling) an exception, i.e., a value in which an exception is enabled when EN is one and is not enabled (is disabled) when EN is zero. Of course, the values of EN can also be inverted such that an exception is enabled when EN is zero and is not enabled (is disabled) when EN is one. Each of the values of EN is set in a bit associated with a bit value specified by BM, i.e., indexed in the BM register 20. For example, in the case of expen 20, 1, which is an execution example of the instruction, because BM is 20 and EN is 1, EN of the 21st bit in the BM register 20 is set at one.

The control execution instruction 12 also has a 32-bit configuration, but it is not limited to such a 32-bit configuration. An operation code field of the 0 to 5th bits expressed as OP indicates that this CPU instruction is one for executing control of an exception, such as one for raising or not raising an exception. A bitmap index field of the 8th to 15th bits expressed as BM indicates an index in the 256-bit BM register 20 provided to determine whether an exception is to be raised or not for each of 256 kinds, which can be represented by 8 bits, as in the case of the control specification instruction 11. When EN of a bit indexed in the BM register 20 is set at one by an expen instruction of the control specification instruction 11 and an exception is supposed to be raised, an address addr of a VEC register 21 associated with the bit indexed in the BM register 20 is referred to, the processing jumps to the exception handler at the address addr specified there, and exception handling is performed. To return from the exception handling, an address next to this instruction is set in the RET register 22 as a return address raddr. A key code field of the 16th to 31st bits expressed as KC is a data field set and used in a program, and a value of KC is stored in the KEY register 23.

For example, in the case of expc 20, 512, which is an execution example of the instruction, because BM is 20 and KC is 512, the 21st bit in the BM register 20 is referred to. When EN of that bit is zero, nothing happens; when the EN is one, an exception is raised. In particular, to shift execution to an exception handler, the processing jumps to the address addr of the exception handler specified by the 21st VEC register 21. The address next to this expc instruction, i.e., the return address raddr is set in the RET register 22. In addition, the 16th to 31st bits in the KEY register 23 are set at 512 as the value of kc. The specified exception handler performs processing corresponding to 512, which is the value of kc. The value of kc can be set to any value by a program, thus allowing the processing itself by the exception handler to be controlled flexibly, other than controlling the processing such that an exception is raised or not. After the completion of the processing by the exception handler, the processing can return to one immediately after the occurrence of the exception by referring to the return address raddr stored in the RET register 22 using a CPU instruction for returning from the exception provided by the CPU architecture.

Figure 3:
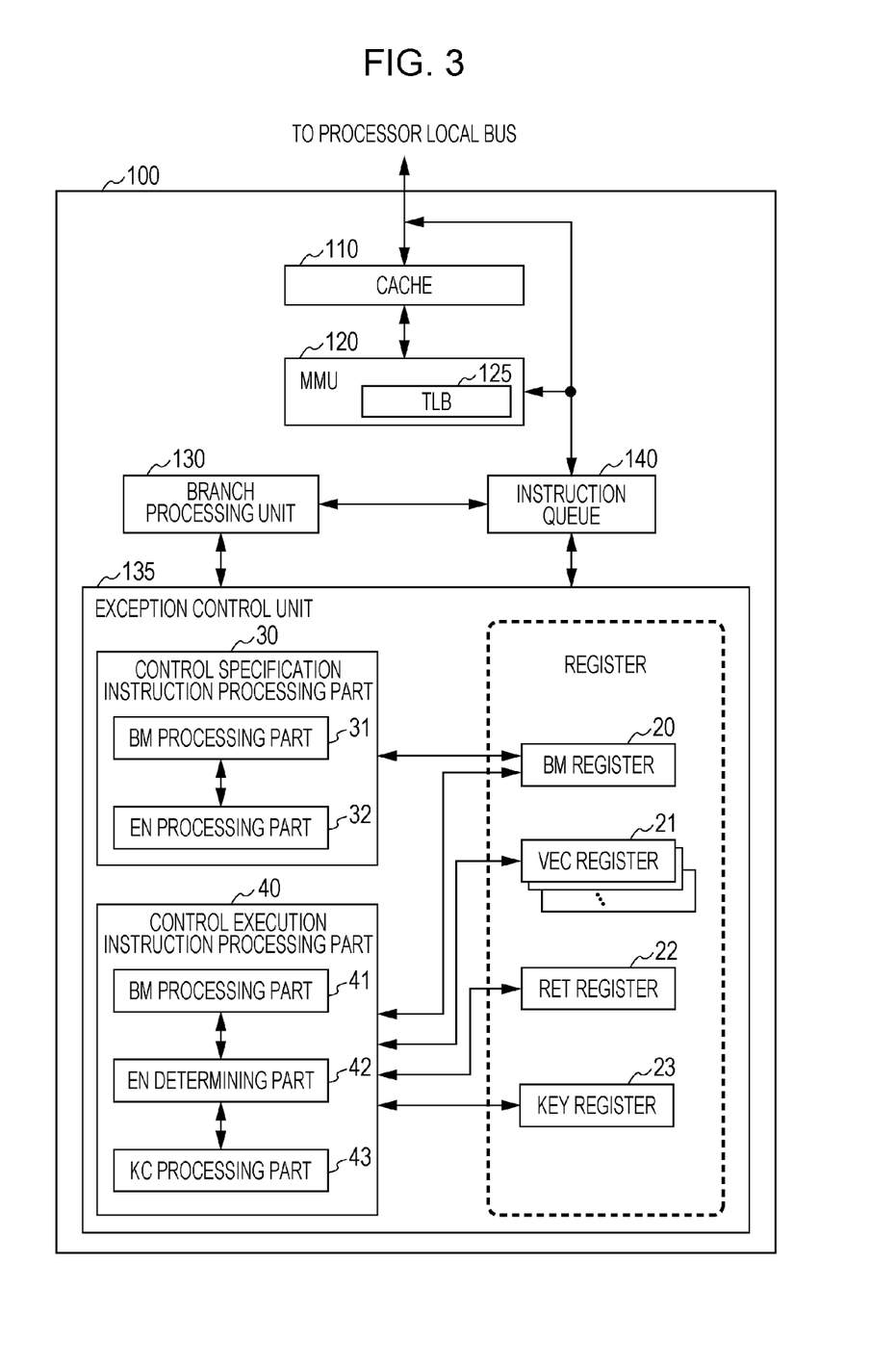
FIG. 3 is a block diagram that schematically illustrates a processor that includes a system for programmably controlling an exception according to one embodiment of the present invention.

FIG. 3 is a block diagram that schematically illustrates a processor 100 including a system for programmably controlling an exception according to one embodiment of the present invention. The processor 100 includes a cache 110 and a memory management unit (MMU) 120. The MMU 120 includes a TLB 125. The processor 100 is provided with an exception control unit 135 configured to programmably control an exception, in addition to a branch processing unit 130 for use in branch processing and an instruction queue 140 for use in storing an instruction. The exception control unit 135 includes a control specification instruction processing part 30 configured to execute the control specification instruction 11 and a control execution instruction processing part 40 configured to execute the control execution instruction 12, in addition to the registers, including the BM register 20, the VEC registers 21, the RET register 22, and the KEY register 23.

The control specification instruction processing part 30 includes a BM processing part 31 and an EN processing part 32. The BM processing part 31 acquires a value specified by BM from the control specification instruction 11 and identifies a bit associated with that value, i.e., an indexed bit in the BM register 20. The EN processing part 32 acquires a value specified by EN from the control specification instruction 11 and sets that value in the bit of the BM register 20 identified by the BM processing part 31.

The control execution instruction processing part 40 includes a BM processing part 41, an EN determining part 42, and a KC processing part 43. The BM processing part 41 acquires a value specified by BM of the control execution instruction 12 and identifies a bit associated with that value, i.e., an indexed bit in the BM register 20. The EN determining part 42 determines whether the value of EN set in the bit in the BM register 20 identified by the BM processing part 41 is zero, which indicates that an exception is not enabled (is disabled). If the value of EN is zero, the control execution instruction processing part 40 ends the processing. Accordingly, exception handling is not performed, and the control execution instruction 12 is removed from the instruction queue 140. If the value of EN is one, which indicates that an exception is enabled, the control execution instruction processing part 40 refers to the address addr of the VEC register 21 associated with the bit in the BM register 20 identified by the BM processing part 41, the branch processing unit 130 causes the processing to jump to the exception handler at that address addr, and exception handling is performed. To return from the exception handling, the control execution instruction processing part 40 sets a next address in which, for example, in the case of 32-bit RISC CPU, four is added to the address of the control execution instruction 12 in the RET register 22, as the return address raddr. In returning from the exception handling, the exception control unit 135 provides the branch processing unit 130 with that return address raddr. In addition, the KC processing part 43 in the control execution instruction processing part 40 stores the value of KC in the control execution instruction 12 in the KEY register 23. The exception control unit 135 provides the exception handler with the value of kc stored in the KEY register 23, and the exception handler performs processing corresponding to the value of kc.

Figure 4:
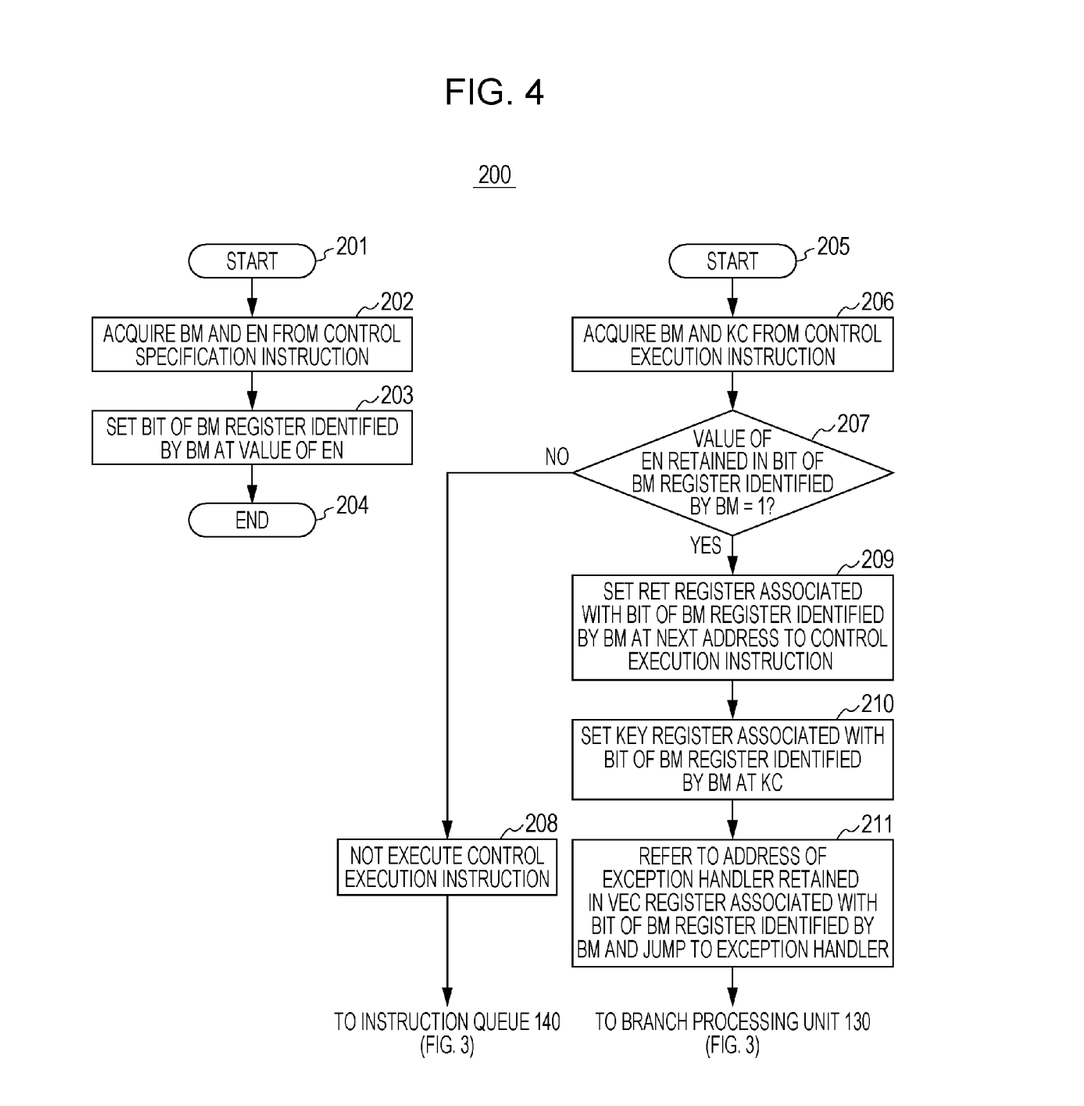
FIG. 4 is a flowchart that schematically illustrates a method for programmably controlling an exception according to one embodiment of the present invention.

FIG. 4 is a flowchart 200 that schematically illustrates a method for programmably controlling an exception according to one embodiment of the present invention. This method can be achieved by the processor 100, in which an exception is software-controllable, illustrated in FIG. 3. In the processor 100, when the control specification instruction 11 is supplied to the instruction queue 140, processing starts (step 201). The processor 100 acquires BM and EN from the control specification instruction 11 (step 202), sets the value of the EN in a bit of the BM register 20 identified by the BM (step 203), and ends the processing (step 204). In the processor 100, when the control execution instruction 12 is supplied to the instruction queue 140, processing starts (step 205). The processor 100 acquires BM and KC from the control execution instruction 12 (step 206) and determines whether the value of the EN of the bit in the BM register 20 identified by the BM is one (step 207). If the determination is "NO," i.e., the value of the EN is not one, the control execution instruction 12 is not executed and is discarded in the instruction queue 140 (step 208). If the determination is "YES," i.e., the value of the EN is one, the processor 100 sets a next address in which, for example, in the case of 32-bit RISC CPU, four is added to the address of the control execution instruction 12 in the RET register 22, as the return address raddr (step 209). The processor 100 sets KC in the KEY register 23 (step 210), as kc. In addition, the processor 100 refers to the address addr of the VEC register 21 associated with the bit in the BM register 20 identified by the BM and makes the processing jump to the exception handler at that address addr by the use of the branch processing unit 130, i.e., shifts the execution (step 211).

Figure 5:
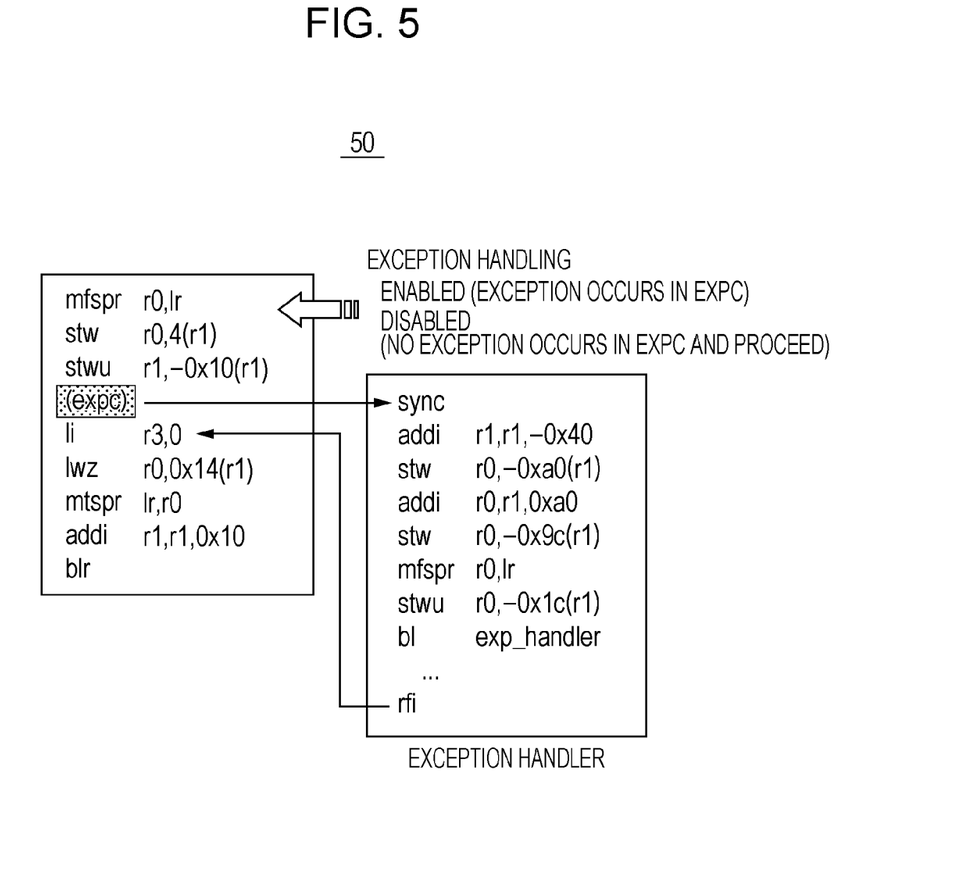
FIG. 5 schematically illustrates an example program created to implement the method for programmably controlling an exception according to one embodiment of the present invention.

FIG. 5 schematically illustrates an example program 50 created to implement the method for programmably controlling an exception according to one embodiment of the present invention. The program 50 includes an expc instruction of the control execution instruction 12. If an expen instruction of the control specification instruction 11 specifies enabling an exception, the execution of the expc instruction is moved to the exception handler for handling the exception. After the exception handler handles the exception, the execution returns to an instruction next to the expc instruction. If the expen instruction of the control specification instruction 11 specifies not enabling (disabling) the exception, the expc instruction causes no action and the execution proceeds to the next instruction.

Figure 6:
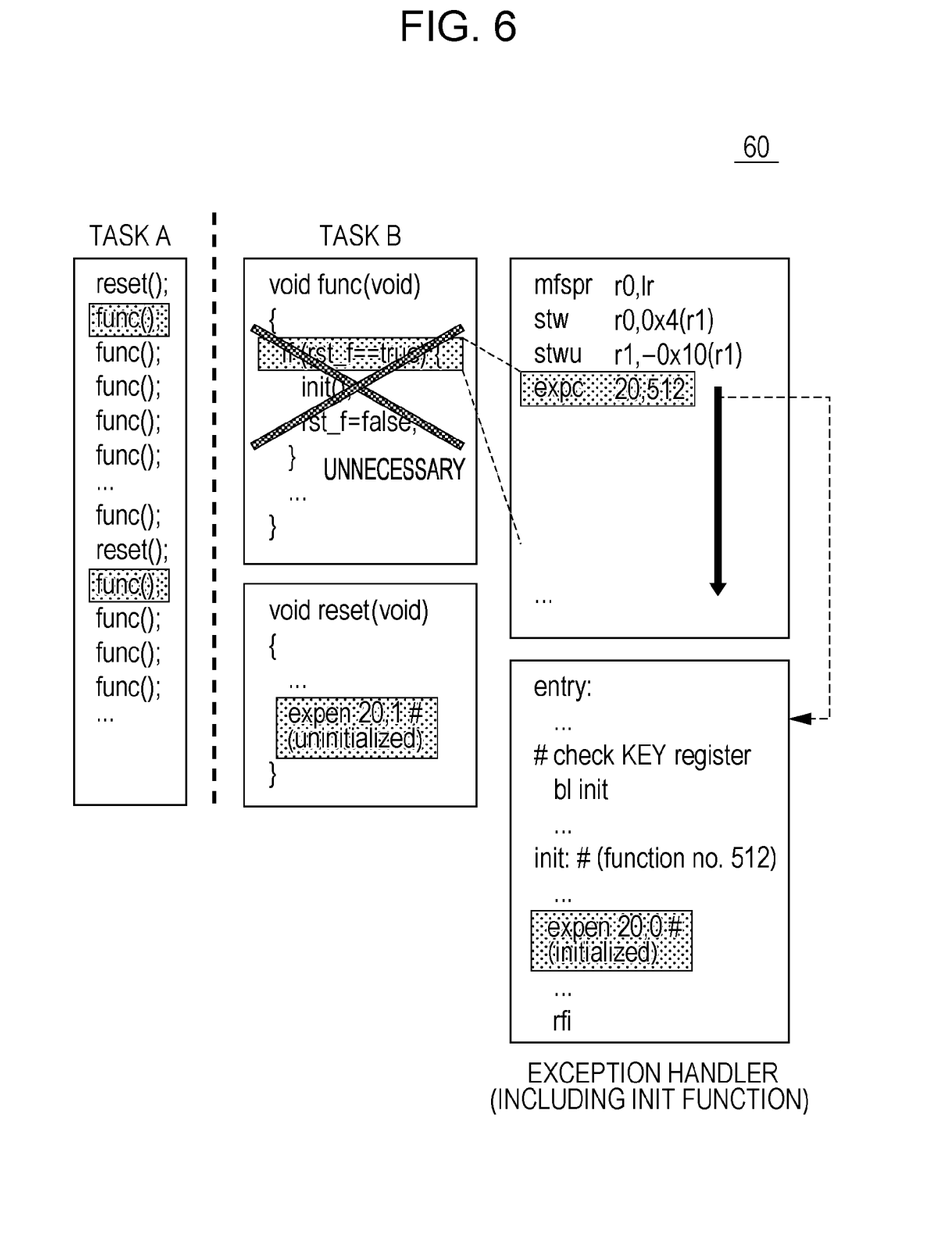
FIG. 6 schematically illustrates another example program created to implement the method for programmably controlling an exception according to one embodiment of the present invention.

FIG. 6 schematically illustrates another example program 60 created to implement the method for programmably controlling an exception according to one embodiment of the present invention. The program 60 corresponds to the program illustrated in FIG. 1. The IF statement in task B is not necessary, and the initial state is not initialized (is uninitialized). Therefore, a function for enabling an exception and performing initialization is first called by an expen 20, 1 instruction of the control specification instruction 11. In the assembly language level illustrated at the right side, an expc 20, 512 instruction of the control execution instruction 12 is provided. This instruction is discarded in the instruction queue without wasting CPU cycles in most cases, and it is executed as an instruction for jumping to an exception handler in rare cases where an exception is enabled. The second operand 512 in the expc 20, 512 instruction is used for determining by a program at a callee the condition or aim of the exception raised by a caller. Here, it is used for specifying the function No. 512, and the initialization function init( ) is called. In the exception handler, after that initialization function, because initialization has been performed (the state has been initialized), disabling an exception is specified by an expen 20, 0 instruction of the control specification instruction 11. In such a way, unlike the prior art, without execution of code for checking processing, an exception interrupt can be raised and initialization can be performed only for a reset state.

Figure 7:
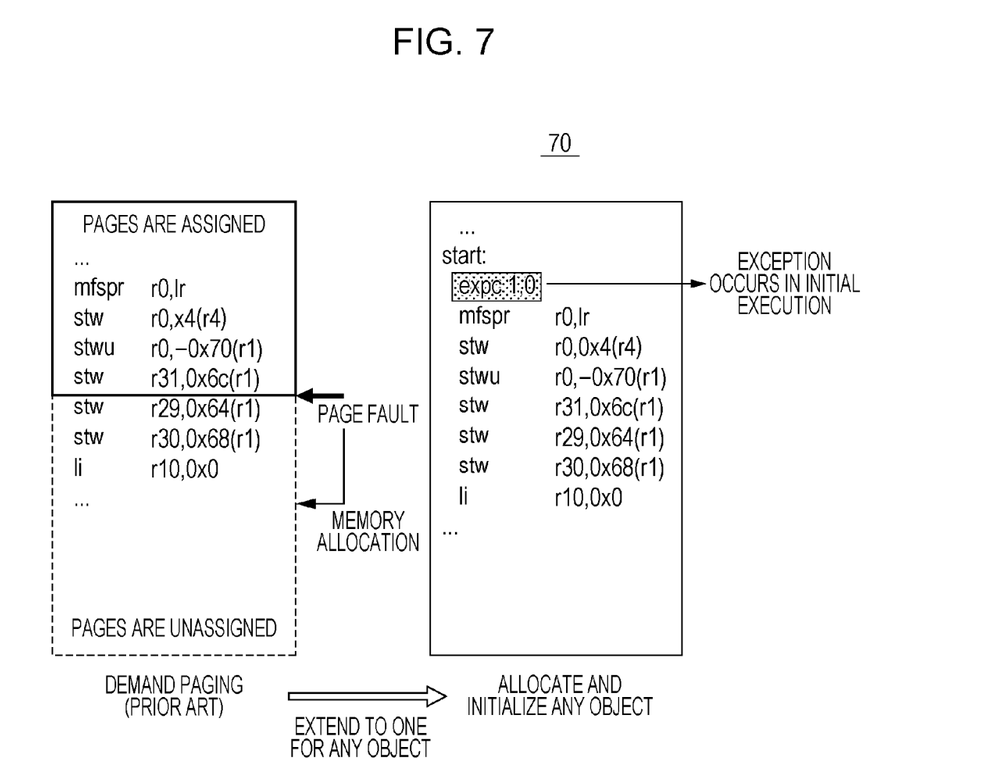
FIG. 7 schematically illustrates still another example program created to implement the method for programmably controlling an exception according to one embodiment of the present invention.

FIG. 7 schematically illustrates still another example program 70 created to implement the method for programmably controlling an exception according to one embodiment of the present invention. This is an example in which demand paging for allocating memory as needed is generalized and any software object is assigned. For an example in the prior art illustrated at the left side, if a CPU attempts to access a region where no page exists, a page fault occurs and memory is allocated in exception handling. For the program 70, an expc 1, 0 instruction of the control execution instruction 12 is provided immediately after start: thus raising an exception in the initial execution and allocating and initializing memory heap. After that, for a call of an exception by the second expc instruction, because the memory heap has already been allocated (an exception is disabled by the expen instruction of the control specification instruction 11), no exception is raised. This example deals with memory heap, but any software resources other than memory, for example, synchronization objects, including a semaphore and mutual exclusion object (mutex), can also be assigned and initialized if desired.

Figure 8:
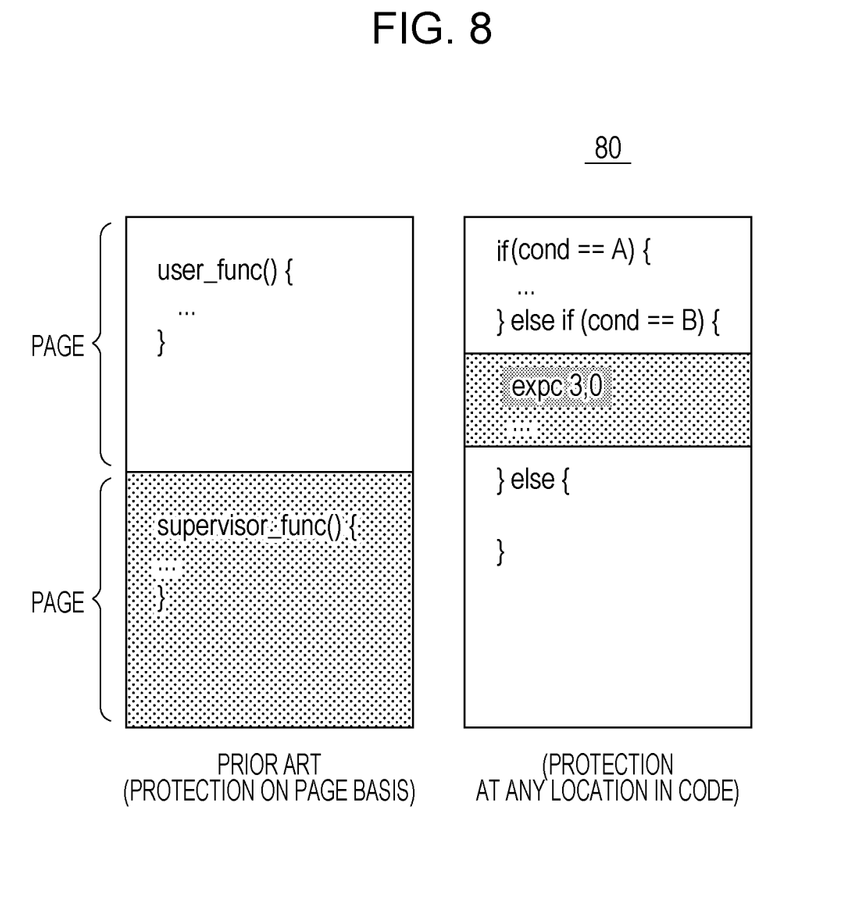
FIG. 8 schematically illustrates further another example program created to implement the method for programmably controlling an exception according to one embodiment of the present invention.

FIG. 8 schematically illustrates further another example program 80 created to implement the method for programmably controlling an exception according to one embodiment of the present invention. This is an example in which a code protection mechanism for protecting code from invalid code execution is generalized. For an example in the prior art illustrated at the left side, an exception interrupt occurs in response to access violation that executes code of privileged mode in non-privileged mode, but it cannot protect code on a page basis of memory. For the program 80, putting the control execution instruction 12 at a necessary location allows an exception to occur at a precise location and can change part of code into a protection region when a certain condition is satisfied, i.e., can achieve exception handling against invalid execution on any code basis. It is to be noted that, to become equivalent to the example in the prior art, it is necessary to extend the expen instruction and the BM register such that the states are separately retained in association with privileged mode and non-privileged mode and, if an attribute, such as one that indicates the read permission, is needed, it is necessary to separately retain it in a register or another component. For the present invention, the use in which a condition is defined as access violation and it enables or disables the occurrence of an exception is assumed. For the program 80, putting an expc 3, 0 instruction of the control execution instruction 12 to the head of a program execution path makes a specified code region (when cond=B) be an exception occurrence region. Enabling an exception by an expen 3, 1 instruction of the control specification instruction 11 causes all code regions including expc 3, x of the control execution instruction 12 to become an exception occurrence region.

The method for programmably controlling an exception according to one embodiment of the present invention is applicable in various forms. For example, it can be applied when execution of a program is traced for the purpose of debugging. In this case, an expc instruction of the control execution instruction 12 is provided at a location of the program where tracing is desired, and code for a log is described in an exception handler. At the time the tracing is desired to start, an exception is enabled by an expen instruction of the control specification instruction 11, and execution of the program is traced by the provided expc instruction. When the method is used as interprocess communication means, an expc instruction is provided in a task in a receiver side, and an expen instruction is executed in a sender side. In that execution, launching the exception handler by the provided expc instruction causes the receiver side to know that a message has been sent. In addition, as an example of application to a system call, a system call for performing execution only when a condition is satisfied can be achieved. For example, a read system call such as a system call performed only for an open state can be generated by the use of the present invention. Various applications can also be made depending on the program.

For an expen instruction of the control specification instruction 11 and an expc instruction of the control execution instruction 12, because the expc instruction does not have dependency to the other CPU instructions other than the expen instruction through a register file, the expc instruction may be deleted from the instruction queue in an instruction pipeline before an execution stage is reached. In this case, in comparison with the case where no expc instruction is provided, a CPU instruction is executable without redundant waste of CPU cycles. In the case of a conditional branch instruction, whether branching is to be performed cannot be determined until execution of an instruction for updating a condition register is completed. In contrast, because an expc instruction does not have such dependency on registers, if no expen instruction exists in the immediately preceding location, whether an exception is to be raised can be determined immediately after the instruction is read in the instruction queue.

In such a way, in comparison with the case of a conditional branch instruction, because pre-processing for the determination of branching is not necessary, if no exception occurs, an expc instruction of the control execution instruction 12 can be processed at higher speed. If an exception occurs, the processing may be slower because it is accompanied by context synchronization. Thus, if high-speed processing is needed, context synchronization processing may not be performed, and the processing may not return to the location where the exception has occurred, i.e., the same operation as in an unconditional branch instruction may be carried out. For the above-described case, which deals with 256 kinds, because many kinds of exception handling can be dealt with, they can be individually assigned as one that requires context synchronization processing and as another that is used in high-speed branch processing.

The present invention is described above using the embodiments. However, the technical scope of the present invention is not limited to the scope described for the embodiments. Various changes or modifications can be added to the embodiments, and the modes to which such changes or modifications are added are also contained in the technical scope of the present invention.

The invention claimed is:

1. A method for programmably controlling an exception in a computer system, the method comprising:
   executing, by an exception control unit, an exception enabling or exception disabling control specification instruction, wherein the control specification instruction includes:
      a bitmap index field indicating a location in a bitmap register, wherein each location in the bitmap register corresponds to one of a plurality of exceptions, and wherein each of the plurality of exceptions corresponds to one of a plurality of vector registers;
      a control specification value that indicates whether to enable or disable an exception which corresponds to the location in the bitmap register;
   executing, by the exception control unit, a control execution instruction, wherein the control execution instruction includes:
      a bitmap index field for the control execution instruction indicating the location in the bitmap register; and
      a key code field indicating a key value used by an exception handler;
   determining, by the exception control unit, whether the value of the bit at the location in the bitmap register indicates that the exception which corresponds to the location in the bitmap register is enabled;

responsive to determining that the value of the bit at the location in the bitmap register indicates that the exception which corresponds to the location in the bitmap register is enabled:
acquiring the key value and storing the key value in a key register;
referencing the location in the bitmap register to identify a vector register which corresponds to the location of the bitmap register, wherein the vector register contains an address of the exception handler; and
extracting the address of the exception handler from the identified vector register, and executing the exception handler using the key value stored in the key register.

2. The method of claim 1, further comprising:
responsive to determining that the value of the bit at the location in the bitmap register does not indicate that the exception which corresponds to the location in the bitmap register is enabled, performing a step of not raising the exception which corresponds to the location in the bitmap register.

3. The method of claim 2, wherein the setting the value of the bit at the location in the bitmap register comprises:
setting the value of the bit at the location in the bitmap register based on the control specification value.

4. The method of claim 3, further comprising:
responsive to determining that the value of the bit at the location in the bitmap register does indicate that the exception which corresponds to the location in the bitmap register is enabled, performing a step of raising the exception which corresponds to the location in the bitmap register.

5. The method of claim 2, further comprising:
discarding the control execution instruction in an instruction queue.

6. A system for programmably controlling an exception, wherein a processor comprises:
an exception control unit configured to execute a control specification instruction and a control execution instruction, wherein the exception control unit comprises:
a bitmap register, wherein referencing a location in the bitmap register is used to identify a vector register of a plurality of vector registers which corresponds to the location of the bitmap register;
each of the plurality of vector registers corresponds to one of a plurality of exceptions, and wherein each of the plurality of vector registers corresponds to one of a plurality of addresses for exception handlers;
a key register storing an acquired key value from a key code field of the control execution instruction, wherein an exception handler that corresponds to one of the plurality of vector registers uses the key value stored in the key register;
a return register containing a next address following executing the exception handler;
a control specification instruction processing part configured to execute the control specification instruction and set a value of a bit at the location in the bitmap register based on a control specification value indicated in the control specification instruction; and
a control execution instruction processing part configured to execute the control execution instruction, determine whether the value of the bit at the location in the bitmap register indicates to enable an exception which corresponds to the location in the bitmap register, and, when the value of the bit at the location in the bitmap register indicates to enable the exception which corresponds to the location in the bitmap register, raise the exception which corresponds to the location in the bitmap register.

7. The system of claim 6, wherein the control execution instruction processing part is configured to not raise the exception which corresponds to the location in the bitmap register when the value of the bit at the location in the bitmap register indicates to not enable the exception which corresponds to the location in the bitmap register.

8. The system of claim 7, wherein the control specification instruction includes a bitmap index field and the control specification field.

9. The system of claim 8, wherein the control execution instruction includes the bitmap index field, and the control execution instruction processing part is configured to raise the exception which corresponds to the location in the bitmap register when the value of the bit at the location in the bitmap register indicates to enable the exception which corresponds to the location in the bitmap register.

10. The system of claim 9, wherein the control execution instruction processing part is configured to set the next address in the return register for execution following executing the exception handler.

11. The system of claim 6, wherein the control execution instruction processing part is configured to reference the location in the bitmap register to identify a vector register which corresponds to the location of the bitmap register.

12. The system of claim 6, wherein the control execution instruction processing part is configured to not raise the exception which corresponds to the location of the bitmap register when the value of the bit at the location in the bitmap register indicates to not enable the exception which corresponds to the location of the bitmap register.

13. A computer program product for programmably controlling an exception comprising:
a computer operating system embodied on a non-transitory computer readable storage medium, the operating system including program instructions executable by a processor, the program instructions comprising:
program instructions to execute an exception enabling or exception disabling control specification instruction, wherein the control specification instruction includes:
a bitmap index field indicating a location in a bitmap register, wherein each location in the bitmap register corresponds to one of a plurality of exceptions, and wherein each of the plurality of exceptions corresponds to one of a plurality of vector registers;
a control specification value that indicates whether to enable or disable an exception which corresponds to the location in the bitmap register;
program instructions to execute a control execution instruction, wherein the control execution instruction includes:
a bitmap index field for the control execution instruction indicating the location in the bitmap register; and
a key code field indicating a key value used by an exception handler;
program instructions to determine whether the value of the bit at the location in the bitmap register indicates that the exception which corresponds to the location in the bitmap register is enabled;
program instructions to, responsive to determining that the value of the bit at the location in the bitmap register indicates that the exception which corresponds to the location in the bitmap register is enabled:

acquire the key value and storing the key value in a key register;
reference the location in the bitmap register to identify a vector register which corresponds to the location of the bitmap register, wherein the vector register contains an address of the exception handler; and
program instructions to extract the address of the exception handler from the identified vector register, and execute the exception handler using the key value stored in the key register.

14. The computer program product of claim 13, wherein the control specification instruction and the control execution instruction execute in a non-privileged mode and a privileged mode, and wherein placement of the control specification instruction in a user software program is user-determined.

* * * * *